(12) United States Patent
Plaquin et al.

(10) Patent No.: US 11,860,207 B2
(45) Date of Patent: Jan. 2, 2024

(54) DETERMINING ELECTRIC FIELD DISTRIBUTIONS

(71) Applicant: Hewlett-Packard Development Company, L.P., Spring, TX (US)

(72) Inventors: David Plaquin, Bristol (GB); Carey Huscroft, Bristol (GB)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/758,143

(22) PCT Filed: Jan. 31, 2020

(86) PCT No.: PCT/US2020/016169
§ 371 (c)(1),
(2) Date: Jun. 29, 2022

(87) PCT Pub. No.: WO2021/154288
PCT Pub. Date: Aug. 5, 2021

(65) Prior Publication Data
US 2023/0063688 A1    Mar. 2, 2023

(51) Int. Cl.
*G01R 29/08* (2006.01)
*G01R 31/312* (2006.01)
(52) U.S. Cl.
CPC ....... *G01R 29/0814* (2013.01); *G01R 31/312* (2013.01)
(58) Field of Classification Search
CPC .......................... G01R 29/0814; G01R 31/312
USPC .......................................................... 324/72
See application file for complete search history.

(56) References Cited

U.S. PATENT DOCUMENTS

| 6,242,911 | B1 | 6/2001 | Maschek |
| 6,922,059 | B2 | 7/2005 | Zank et al. |
| 7,843,339 | B2 | 11/2010 | Kirmayer |
| 8,576,536 | B2 | 11/2013 | Rossi et al. |
| 8,810,249 | B2 | 8/2014 | Cehelnik |
| 9,009,860 | B2 | 4/2015 | Klum et al. |
| 9,624,694 | B2 | 4/2017 | Kincaid |
| 2006/0139032 | A1* | 6/2006 | Kalokitis ........... G01R 29/0814 324/457 |
| 2015/0007353 | A1 | 1/2015 | Franciscus Widdershoven et al. |
| 2015/0268729 | A1* | 9/2015 | Cehelnk ................. G06F 3/017 340/870.3 |
| 2017/0102419 | A1 | 4/2017 | Suwald |

(Continued)

FOREIGN PATENT DOCUMENTS

EP    0890108 B1    10/2000

OTHER PUBLICATIONS

Cypress, V., Semiconductor, "Achieve tamper-proof capacitive sensing," Jan. 12, 2015, EDN Network, pp. 1-8.

(Continued)

*Primary Examiner* — Christopher P McAndrew
(74) *Attorney, Agent, or Firm* — Knobbe, Martens, Olson & Bear, LLP (57) ABSTRACT

In an example, a method includes receiving an indication of an electrical parameter associated with at least part of a computing device. The method further includes determining whether or not the indication is indicative of an expected electric field distribution associated with a specified hardware configuration for the computing device.

14 Claims, 4 Drawing Sheets

(56) References Cited

U.S. PATENT DOCUMENTS

2017/0370978 A1\* 12/2017 Basu .................. H04W 4/023
2018/0240117 A1\* 8/2018 Rezayee ............. G06Q 20/341
2020/0003818 A1   1/2020 House et al.

OTHER PUBLICATIONS

Deepu, R., et al., "Comb Capacitor structures for On-Chip physical Uncloneable Function", IEEE, vol. 22, Issue 1, Feb. 1, 2009, pp. 96-102.
Obermaier, J., et al., "The past, present and future of physical security enclosures from battery-backed monitoring to PUF-Based inherent security and beyond", Journal of hardware and systems security, vol. 2, Issue 4, Dec. 1, 2018, pp. 289-296.
Skoric, B., et al., "Information-theoretic analysis of capacitive physical unclonable functions", Journal of applied physics, vol. 100, Issue 2, Jul. 17, 2006, pp. 24902-024902.
Wei, L., et al., "BoardPUF: Physical unclonable Functions for printed circuit board authentication", IEEE, Nov. 2, 2015, pp. 152-158.

\* cited by examiner

DETERMINING ELECTRIC FIELD DISTRIBUTIONS

BACKGROUND

A computing device may be modified during various stages of the manufacturing process or by an end user. Certain modifications to the computing device may cause the computing device to have different functionality to its functionality prior to modification.

BRIEF DESCRIPTION OF DRAWINGS

Non-limiting examples will now be described with reference to the accompanying drawings, in which.

DETAILED DESCRIPTION

There may be scenarios where a component installed in a computing device is not the same as an expected component for the computing device. For example, the computing device may be tampered with during the manufacturing process, before distribution to an end user or even after the end user has received the computing device.

There may be various opportunities in a supply chain or after distribution to an end user for an entity to tamper with the computing device or supply a compromised or unauthorized component for installation in the computing device. For example, on a production line, a compromised component may be intentionally or unintentionally installed on the computing device. In another example, an attack could be performed on the computing device in an untrusted environment such as during transit from a manufacturing facility to an end user, or even while the computing device is left unattended (e.g., by an end user).

Figure 1:
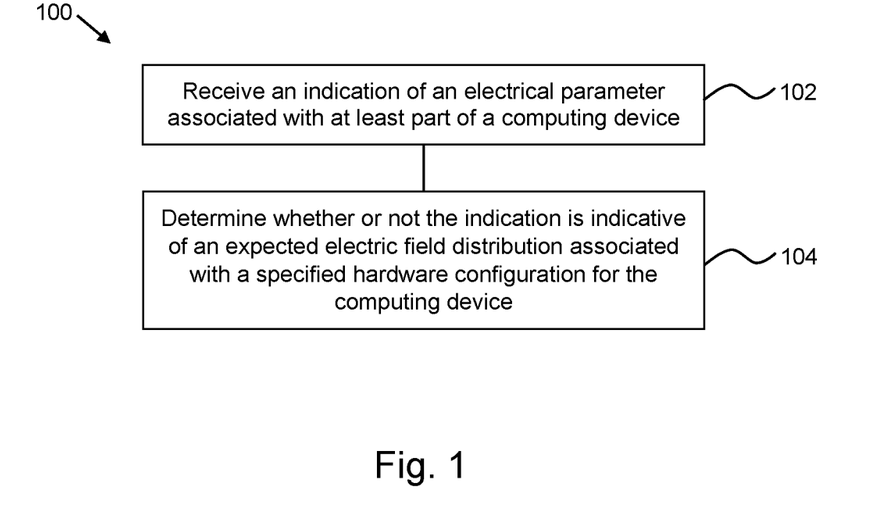
FIG. 1 is a flowchart of an example method of determining certain information about a computing device.

FIG. 1 depicts a flowchart of a method 100, which may be a computer-implemented method, of determining certain information about a computing device. The method 100 may be implemented by an entity such as an end user, manufacturer or other verifying entity. The method 100 may be implemented using processing circuitry of, for example, a personal computer, dedicated processing apparatus, server, cloud-based service or any other computing device.

The method 100 comprises, at block 102, receiving an indication of an electrical parameter associated with at least part of a computing device.

In some examples, the electrical parameter may be measured at a specified location associated with the computing device. In some examples, the electrical parameter may comprise a quantity such as capacitance, inductance, impedance, etc. The indication may comprise or be indicative of an electrical value such as a voltage, charge and/or current value, etc. Measurement of the electrical value (e.g., over time) may be used to determine the electrical parameter.

In some examples, a component (e.g., capacitor, inductor, resistor, etc) may be associated with a certain electrical parameter (e.g., capacitance, inductance, impedance, etc). The electrical parameter may vary depending on the electric field surrounding the component and/or an electric field generated by component itself. The component may be associated with a certain electrical value (e.g., voltage and/or current, etc measured across the component). Thus, the electrical value may be a measurable quantity (associated with the component) which can be used to determine the electrical parameter (e.g., the capacitance, inductance, impedance, etc).

In some examples, measuring the electrical value may comprise measuring at least one of voltage, current, voltage and/or current evolution over a specified time, a charge/discharge time, resonance frequency and/or a variation of the voltage of a polarized component (e.g., a capacitor), etc.

In some examples, receiving the indication of the electrical parameter may comprise receiving the value (or an indication thereof) of the electrical parameter (e.g., capacitance value, inductance value, impedance value, etc). In some examples, receiving the indication of the electrical parameter may comprise receiving the electrical value (or an indication thereof), which can be used to determine the value of the electrical parameter.

In some examples, the electrical parameter may be associated with a component of the computing device itself (e.g., the component may be part of the circuitry of the computing device). In some examples, the electrical parameter may be associated with a sensor or other device for obtaining certain information regarding the computing device (e.g., the component may not be part of the circuitry of the computing device; instead the component may be part of the sensor or other device).

As will be explained in more detail below, the received indication of the electrical parameter may be used to determine or otherwise infer certain information regarding the computing device.

The method 100 comprises, at block 104, determining, using processing circuitry, whether or not the indication is indicative of an expected electric field distribution associated with a specified hardware configuration for the computing device.

As will be explained in more detail below, the specified hardware configuration for the computing device may affect the electric field distribution. Thus, in some cases, a variation in the hardware configuration for the computing device (e.g., a variation in the number, location, type and/or distribution of electronic components in the computing device) may influence the electric field distribution.

A variation in the electric field distribution may, in some cases, affect the electrical parameter. For example, if a component (that is associated with the electrical parameter) is at a certain location relative to the computing device, a variation in the hardware configuration of the computing device may affect the electric field observed by the component. In other similar words, if the component observes a certain electric field at its location, the value of the electrical parameter may be affected by the electric field at its location.

The electric field observed at a certain location may be dependent on the hardware configuration of the computing device. Thus, the electric field distribution may depend on the hardware configuration of the computing device.

The electrical parameter associated with the component may be influenced by the hardware configuration since the electrical parameter observed at the component may be influenced by any variation in the electric field (which may be dependent on the hardware configuration). A measurement of the electrical parameter at different locations relative to the computing device may be indicative of the electric field distribution associated with the hardware configuration for the computing device.

The indication received in block 102 may be used to determine whether or not the electric field at a certain location is indicative of the expected electric field distribution. For example, for the specified hardware configuration, a certain electric field may be expected to be observed at the certain location. If this certain electric field is observed at this certain location, the measurement of the electrical parameter at this location may be indicative that the electric field distribution is as expected. Further measurements of the electrical parameter at other locations may be used to provide confirmation that the electric field distribution is as expected. In this case, a determination may be made that the computing device has the specified (e.g., expected) hardware configuration.

However, if the measurement of the electrical parameter at the location is indicative of a different electric field distribution (e.g., an unexpected electric field distribution), this may be indicative that the computing device does not have the specified hardware configuration. For example, if the hardware configuration is not as expected, the electric field distribution may be different to what is expected. In other similar words, the received indication of the electrical parameter may be indicative that the hardware configuration for the computing device being tested is not the same as the specified (e.g., expected) hardware configuration for the computing device.

Thus, in some examples, the indication of the electrical parameter may be used to determine whether or not a computing device under test has the specified hardware configuration.

In some examples, the specified hardware configuration for the computing device may refer to the number, type and/or distribution of hardware (e.g., electronic hardware) components used in the computing device. A component (e.g., a hardware component) of the computing device may affect the electric field distribution. In some examples, the component may itself generate an electric field, which may contribute to the overall electric field distribution associated with the computing device. In some examples, the component may affect the electric field generated by another component (e.g., of the computing device or of another device such as a sensor). Examples of hardware components include, for example, electrical conductors, resistors, capacitors, inductors, logic gates, microprocessors and/or any other component capable of generating an electric field or influencing an electric field. The hardware components may affect the electric field in different ways depending on whether or not the computing device is powered on or off.

In some examples, the circuitry of the computing device may generate an electric field e.g., due to the flow of current through the circuitry and/or distribution of charge throughout the computing device. In some examples, the circuitry of any other components or devices (such as a sensor described below) may generate an electric field. In some examples, the circuitry of the computing device and/or the circuitry of any other components or devices may affect the electric field distribution associated with the specified hardware configuration for the computing device. The number, type and/or distribution of components (including electrical conductors) of the computing device may affect the electric field distribution associated with the specified hardware configuration for the computing device. The circuitry of the computing device and/or the electric field generated by such circuitry may affect certain electrical parameters observed at certain locations.

In some examples, the location may refer to a component of the computing device itself. In some examples, the location may refer to a component of another device such as a sensor not part of the circuitry of the computing device itself.

A determination of the electrical parameter at a certain location associated with the computing device may be indicative of the electric field distribution for the computing device. In some examples, the electric field distribution may comprise an electric field contribution due to at least one of the circuitry (e.g., including a hardware component) of the computing device and the circuitry of any other components or devices (such as a sensor) in the proximity of the computing device.

Since the number, type and/or distribution of components of the computing device may affect the electric field distribution, the electric field distribution may be indicative of the type of components in the computing device and/or the distribution of these components. If the computing device is tampered with (e.g., if a hardware change occurs), this tampering may affect the electric field distribution. For example, if any component of the computing device is new or compromised in some way, this component may affect (e.g., modify) the electric field distribution. This change to the electric field distribution may be detectable via the indication of the electrical parameter. An entity such as a device manufacturer, end user or other verifying entity may use the indication to determine whether or not the computing device has been tampered with (e.g., if the hardware configuration of the computing device is not as expected).

In some examples, the method 100 may enable a determination to be made regarding whether or not the computing device has been tampered with. Tampering may take various forms such as: adding a compromised component, modifying an existing component, replacing an existing component with a compromised component. Thus, in some examples, the method 100 may enable a determination to be made regarding whether a change to the hardware of the computing device has occurred.

The method 100 may allow a verifying entity such as an end user or device manufacturer to be confident that the provenance and/or integrity of the computing device is as expected. The method 100 may facilitate the detection (e.g., in real-time or after the event) of a tamper attempt. Accordingly, another tamper attempt indicator (e.g., on the device packaging) may not be used, or the method 100 may be used alongside the other tamper attempt indicator to provide additional assurance to the verifying entity.

Figure 2:
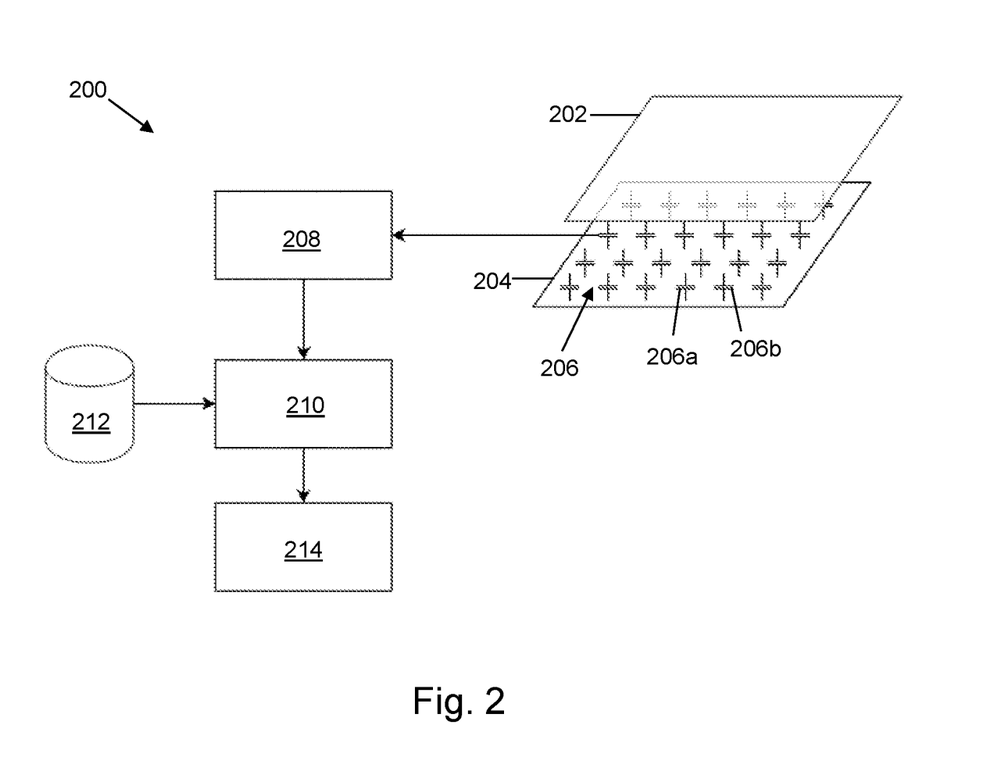
FIG. 2 is a simplified schematic illustration of an example system for implementing certain methods.

FIG. 2 shows an example system 200 for implementing certain methods described herein (e.g., method 100). In this example, the system 200 enables certain information to be determined about a computing device 202 (e.g., a printed circuit assembly (PCA)). For example, the system 200 may enable a determination to be made as to whether or not the computing device 202 has been tampered with (e.g., whether or not a change to the hardware of the computing device 202 has occurred).

The example system 200 comprises a sensor 204, which in this example comprises a capacitor array 206, for measuring an electrical parameter (in this example, capacitance) at specified locations associated with the computing device 202. A capacitor 206*a* of the capacitor array 206 is positioned at a location associated with the computing device 202. The capacitor 206a may be sensitive to the local electric field (e.g., generated by the capacitor 206a itself and/or generated or otherwise influenced by the circuitry of the computing device 206), which may be affected by the number, type and/or distribution of components in the computing device 202 proximal to the capacitor 206a (although in some cases components distal to the capacitor 206a may affect the local electric field observed by the capacitor 206a). For example, the capacitance of the capacitor 206a may be affected by the number, type and/or distribution of components in the computing device 202. Another capacitor 206b of the capacitor array 206 may be affected by the type and distribution of components in the computing device 202.

In some examples, the capacitor array 206 itself may generate an electric field which may be affected by the hardware configuration of the computing device 202. In this case, any change to the hardware configuration may be detectable by causing a change to the electric field generated by the capacitor array 206 (and hence, causing a detectable change to the capacitance in at least one of the capacitors 206). In some examples, a change to a hardware configuration of the computing device 202 may be detectable (by the capacitor array 206) in the electric field generated by (e.g., operation of) the capacitor array 206. In some examples, a change to the hardware configuration may influence the electric field generated by the capacitor array 206. For example, the number, type and/or distribution of components in the computing device 202 may influence the electric field observed by the capacitor array 206 (e.g., irrespective of whether the computing device 202 is powered on or off). In some examples, if the computing device is powered on, the computing device 202 may itself generate an electric field (e.g., a parasitic electric field), which may affect the electric field observed by the capacitor array 206.

A change to the capacitance at any of the capacitors of the capacitor array 206 may in some cases be indicative of the computing device 202 having been tampered with. In some cases, a change to the capacitance at a combination of the capacitors of the capacitor array 206 may be indicative of the computing device 202 having been tampered with. The change to the capacitance may be determined based on a change to a measured electric value (e.g., current, voltage) associated with the capacitor 204a, 204b that observes such a change. Thus, the measured electric value may provide the indication of the electrical parameter (i.e., capacitance in this example) measured at a specified location associated with the computing device 202.

The sensor 204 is depicted as spatially separated from the computing device 202 in FIG. 2 although the sensor 204 may or may not be spatially separate from the computing device 202.

In some examples, the sensor 204 may be provided as circuitry that is distinct/separate from the circuitry of the computing device 202 itself (e.g., the capacitor array 206 may be provided as part of a different PCA to the computing device 202). For example, the sensor 204 may be positioned in an appropriate location relative to the computing device 202 in order to perform measurements. In another example, the sensor 204 may be installed as part of the same PCA as the computing device 202 but using separate circuitry to the circuitry of interest in the computing device 202 (e.g., the sensor 204 may be provided as part of a different layer of the PCA). In some examples, the sensor 204 may be installed in situ for performing the measurements (e.g., the sensor 204 may be permanently installed alongside the computing device 202 within or combined with the packaging of the computing device 202).

In some examples, the sensor 204 may be provided as part of the circuitry of the computing device 202 itself (e.g., the capacitor array 206 may be embedded with the computing device 202 itself and use the same circuitry as the circuitry of interest of the computing device 202). For example, the sensor 204 and the computing device 202 may share the same platform e.g., as part of the same PCA (or a layer thereof).

If the sensor 204 can be installed in situ with the computing device 202, this may provide the ability to provide measurements for a period of time, which may increase the likelihood of detecting a tamper attempt (e.g., during manufacturing or even after supply to an end user). These measurements may be performed at any time using any specified schedule to increase the likelihood of detecting any tamper attempts. A verifying entity may rely on measurements provided by the sensor 204 itself and, in some examples, may not use any other dedicated equipment for detecting a tamper attempt.

In some examples, the sensor 204 may be positionable adjacent the computing device 202 (e.g., temporarily by a verifying entity) in order to take measurements while the sensor 204 is in situ. In some examples, the sensor 204 may comprise a dedicated device for performing the measurements. For example, the sensor 204 may comprise a touchscreen (e.g., a capacitive touchscreen such as may be used in a smart phone or other touch-sensitive device for receiving user input). Capacitive touchscreens may be relatively inexpensive and readily deployable to obtain measurements. The technology used in capacitive touchscreens may be combined with a PCA implementing the functionality of the computing device 202. For example, capacitors used in touchscreens may be installed at appropriate positions within the PCA (e.g., connected via dedicated circuitry lanes which are connectable to processing circuitry for obtaining measurements associated with the capacitors). In some examples, circuitry for obtaining measurements (e.g., from a capacitor array 206) may already be implemented by the computing device 202.

In some examples, the touchscreen may be positioned proximal to (e.g., above or adjacent to) a computing device such as a motherboard in order to take measurements from such a computing device (e.g., to determine whether or not the computing device has been tampered with). In some examples, the touchscreen may be controlled by the computing device (e.g. the computing device may control what is displayed on the touchscreen). In some examples, the touchscreen may be used to provide user input to the computing device (e.g., a user touch may provide instructions for execution by the computing device).

In some examples, a touchscreen of a user device may be used in certain scenarios to determine whether or not the computing device of the user device has been tampered with. For example, a user device such as a clamshell device (e.g., a folding phone, tablet, notebook or laptop) may comprise a touchscreen that can be positioned proximal to the computing device of the clamshell (such as when the clamshell device is closed). While in this closed position, the touchscreen may be used to take measurements which can be used to determine whether or not the computing device of the clamshell device has been tampered with. In another example, the touchscreen of, for example, a smartphone or tablet may be proximal to the computing device of the smartphone/tablet at all times (due to the design of the smartphone/tablet). In any case, the touchscreen of the user device may be sensitive to any changes in the hardware configuration of the computing device.

In some examples, isolated electrical contacts (e.g., circuitry lanes) in the PCA may form a capacitor-like structure. Measurements of electrical values associated with such electrical contacts may provide the indication. Thus, in some examples, dedicated structures of the PCA such as isolated electrical contacts may provide the indication without utilizing any more expensive components such as dedicated capacitors.

In some examples, a capacitive touchscreen may comprise a capacitor array 206. In use, the sensor 204 may be positioned at an appropriate location relative to the computing device 202 and measurements taken as needed. The sensitivity of the sensor 204 such as a capacitive touchscreen may be varied according to a specified need for the computing device 202. For example, if a specified sensitivity is needed for detecting variations in the electric field distribution, the sensor 204 may be appropriately selected accordingly (e.g., by selecting a certain number, type and/or distribution of capacitors 206a, 206b). If the sensor 204 is in the form of a capacitive touchscreen, the touchscreen may be constructed according to the application and/or specified sensitivity. For example, a certain layer (e.g., a protective layer) of the touchscreen may be omitted and/or the circuitry of the touchscreen could be modified to increase sensitivity.

In some examples, the capacitors 206a, 206b of the capacitor array 206 are distributed at specified positions relative to the computing device 202 (e.g., the capacitors 206a, 206b may be distributed at least partially throughout or adjacent the computing device 202). In some examples, the position of the capacitors 206a, 206b may be fixed (e.g., if the sensor 204 is installed in situ with the computing device 202 or as part of its packaging, for example). In some examples, the position of the capacitors 206a, 206b may not be fixed (e.g., if the sensor 204 is not installed as part of the computing device 202 such as may be the case if a user can position the sensor 204 as needed).

In some examples, at least some of the capacitors 206a, 206b may be arranged in a regular pattern (e.g., a grid of capacitors 206a, 206b with a regular or repeated spacing therebetween). In some examples, at least some of the capacitors 206a, 206b may be arranged in an irregular pattern (e.g., a grid of capacitors 206a, 206b with a random, non-repeating or non-uniform spacing therebetween). The particular pattern of capacitors 206a, 206b may be such as to increase a signal-to-noise ratio when measuring the electrical parameter. For example, a particular component of interest of the computing device 202 may affect the electric field distribution in a relative insignificant manner. The number, type and/or position of certain capacitors 206a, 206 relative to this particular component may be such that any change to the electric field distribution (e.g., due to tampering) may be detected even though the change to the electric field distribution may be relatively insignificant if a tamper event occurs. In some examples, a capacitor 206a may have a different property (e.g., different capacitance) to another capacitor 206b of the capacitor array 206. The property of the capacitors 206 may be selected according to a specified sensitivity for the specified location of the capacitor 206. For example, where more sensitivity is needed for a specified location, a capacitor 206 with a different capacitance may be selected for the specified location (e.g., so that a detectable change in capacitance may be observed if a tamper event occurs).

The system 200 further comprises a measurement module 208 for measuring the electrical parameter (e.g., to measure capacitance). The measurement module 208 is communicatively coupled to the sensor 204 to receive the indication therefrom and/or facilitate measurement of the electrical parameter. In some examples, the measurement module 208 is to measure an electrical value (e.g., voltage and/or current evolution over a specified time, a charge/discharge time, resonance frequency and/or a variation of the voltage of a polarized capacitor) which can be used to determine the capacitance of a capacitor 206a, 206b of the sensor 204. In such examples, the measurement module 208 may comprise circuitry for determining the voltage and/or current associated with a particular capacitor 206a, 206b of the sensor 204.

In some examples, the measurement module 208 may obtain measurements continually (e.g., regularly or according to a specified time interval or schedule). In some examples, the measurement module 208 may obtain measurements upon demand (e.g., the measurement may be initiated upon request by another entity such as a user, scheduler or management component). In some examples, a measurement may be performed by the measurement module 208 when a certain condition is met (e.g., if the computing device 202 may enter a particular state (e.g., power state) and/or if the sensor 204 is in a position suitable for measurements to be taken).

In some examples, the measurement module 208 may perform measurements with a specified sensitivity depending on certain factors.

In some examples, the purpose of the capacitor 206a, 206b of interest may influence the how sensitive the capacitor 206a, 206b is to be (or what is configuration is to be in relation to the computing device 202) in order to detect a change in capacitance. For example, the capacitance of the capacitor 206a, 206b and/or its position and/or sensing region size may influence how sensitive the particular capacitor 206a, 206b is to a perturbation to the electric field distribution. Thus, in some examples, if a particular hardware component does not significantly affect the electric field distribution, a capacitor may be positioned proximal to the hardware component and/or its sensitivity may be selected (e.g., its capacitance may be selected) such that any changes to the electric field distribution due to tampering of the particular component may be detected even if the perturbation to the electric field distribution is relatively small. Similarly, if a particular hardware component significantly affects the electric field distribution, a capacitor may be positioned distal to the hardware component and/or its sensitivity may be selected (e.g., reduced compared with the previous example) providing any changes to the electric field distribution due to tampering of the particular component can still be detected.

In some examples, the capacitor 206a, 206b of interest may be dedicated to detecting any new components installed in the computing device 202. In some examples, the capacitor 206a, 206b of interest may be dedicated to detecting a proximity of a component being tampered with. Any combination of the above examples may be used to influence the sensitivity of the measurement. In some examples, the design of the capacitor array 206 may be selected according to a risk factor such as whether a particular component is vulnerable to tampering, in which case, the capacitor(s) selected for detecting a tamper attempt may be positioned and/or specified as appropriate according to the risk factor.

In some examples, the state of the computing device 202 may influence the number and/or type (e.g., sensitivity) of the measurement being taken, for example, depending on a level of risk associated with the state or a change of state.

In some examples, the state of the computing device 202 may influence a model (e.g., as described herein) used to establish whether or not the indication is indicative of the expected electric field distribution. In some examples, the model may be adjusted and/or a different model may be used depending on the particular state (e.g., power state) of the computing device 202. For example, if a particular state (or change in state) is associated with a higher risk of the computing device 202 being tampered with, the model may be adjusted and/or a different model to reflect this higher risk and to increase the likelihood of identifying a potential attack.

In some examples, a power and/or activity of the computing device 202 may affect the number and/or type of the measurement to be obtained (e.g., by the sensor 204). For example, if the computing device 202 is powered off for some reason (e.g., unexpectedly or due to a reboot), the number and/or type of the measurement performed may be adjusted appropriately (e.g., to a higher than normal sensitivity in case the computing device 202 is more likely to have been tampered with due to its particular state). In another example, a sensitivity and/or accuracy of the measurement may be increased during power off since an electric field (e.g., parasitic electric field) generated by the hardware of the computing device 202 during its powered-on operation may be reduced or minimized during power off. Thus, in some examples, the sensor 204 may be able to detect a change to the electric field distribution associated with the computing device 202 during power off due to, for example, a hardware component not being in an expected position and/or not being an expected size, and the electric field distribution (e.g., generated by the sensor 204) being modified by this unexpected hardware configuration.

In some examples, the level of sensitivity of a measurement obtained by the sensor 204 may be based (e.g., dynamically) based on a present and/or previous state of the computing device 202. In some examples, the level of sensitivity may be informed by the model used to determine whether or not the indication is indicative of the expected electric field distribution.

In some examples, the position of the capacitor 206a 206b of interest relative to the computing device 202 may influence the specified sensitivity. For example, if the position of the capacitor 206a, 206b is thought to be associated with a decreased likelihood of detecting a change to the electric field distribution, the sensitivity of the measurements performed may be appropriately selected (e.g., by causing an increase to the sensitivity of the capacitor 206a, 206b of interest such as by adjusting the circuitry associated with the capacitor 206a, 206b of interest as appropriate).

The system 200 further comprises a determining module 210 (e.g., comprising processing circuitry) for determining whether or not the indication is indicative of an expected electric field distribution for the computing device 202. In some examples, the determining module 210 may implement block 104 of the method 100. The determining module 210 may receive the indication from the measurement module 208. Thus, the determining module 210 may use a measurement obtained by the measurement module 208 to determine whether or not a component of the computing device 202 has been tampered with.

In some examples, the system 200 further comprises a model 212 (e.g., a memory accessible to the determining module 210 comprising information regarding an expected electrical parameter and/or electric field distribution for the computing device 202), which the determining module 210 can use to determine whether or not the computing device 202 has been tampered with.

In some examples, the model 212 comprises an electric field distribution model such as described herein.

In some examples, the model 212 may be used to compare an expected measurement of an electrical parameter at a specified location relative to the computing device 202 with an expected (e.g., initial) measurement of the electrical parameter. For example, the expected measurement of the electrical parameter may have been obtained at a trusted time during the manufacture of the computing device 202. This expected/initial measurement may be used as a baseline to compare with subsequent measurements of the electrical parameter.

In some examples, the model 212 may be used to detect an unexpected object or component in the proximity of the computing device 202.

In some examples, the determining module 210 may be capable of detecting a difference or discrepancy between the data provided by the model 212 and the indication. Where such a difference or discrepancy is detected, subject to certain criteria, the determining module 210 may determine that the computing device 202 has been tampered with. However, if no such difference or discrepancy is detected, the determining module 210 may determine that the computing device 202 has not been tampered with. The determining module 210 may provide a notification regarding a status or trustworthiness of the computing device depending on whether or not a determination has been made that the computing device 202 has been tampered with.

In some examples, data provided by the model 212 may be used for a comparison between the indication and an expected value for the electrical parameter (i.e., as provided by the data). Where the difference between the indication and the expected value for the electrical parameter is such that a specified threshold is exceeded, this may indicate that the computing device 202 has been tampered with.

In some examples, the model 212 may be based on a plurality of parameters (e.g., electrical parameters) from a set of measurements. For example, multiple measurements (e.g., capacitance measurements) may be obtained from the capacitor array 206. In some cases, a tampering attempt may not be directly detectable from a single measurement but instead may be detectable by analyzing the multiple measurements from the capacitor array 206 (e.g., multiple measurements from a single capacitor 206a at different times and/or measurements from a plurality of capacitors 206a, 206b at the same time or at different times). For example, the model 212 may implement a machine learning approach to analyze the data provided by the measurement module 208. For example, the machine learning-based model 212 may have been trained using measurement data indicative of whether or not a computing device 202 has been tampered with such that, in use, the determining module 210 may use the model 212 to predict whether or not a certain measurement or set of measurements is indicative of a tamper attempt. In some examples, the model 212 may be used to infer a probability that a tamper attempt has occurred.

In some examples, the determining module 210 may detect a non-conform perturbation of an electric field surrounding a capacitor 206a (or a plurality of capacitors 206a,b) of the capacitor array 206. In some examples, the model 212 may provide or comprise information regarding an electric field that conforms to the expected electric field associated with a specified hardware configuration for the computing device 202. A certain perturbation to the electric field may conform to the model (i.e., the specified hardware configuration for the computing device 202 may be as expected, for example, the computing device 202 has not tampered with). However, if the perturbation does not conform to the model 212 (i.e., 'non-conform'), this may indicate that the electric field does not conform to the expected electric field associated with the specified hardware configuration for the computing device 202 (i.e., the specified hardware configuration for the computing device 202 may not be as expected, for example, the computing device 202 has or may have been tampered with). An example of a non-conform perturbation may be if the capacitance of the capacitor 206a or a plurality of capacitors 206 changes by a certain value, for example, by exceeding a threshold value. In some examples, a non-conform perturbation may be detected by analyzing multiple measurements from the capacitor 206a (e.g., at different times) or the plurality of capacitors 206a,b (e.g., at the same time or at different times).

The system 200 further comprises a response module 214 communicatively coupled to the determining module 210. The response module 214 may take certain action depending on whether or not the determining module 210 determines that a tamper attempt has or may have taken place. Various possible actions may be taken by the response module 214, as will be explained in more detail below.

In some examples, the response module 214 may send a notification to a user, management infrastructure or other verifying entity with any information about the attack/potential attack on the computing device 202. This notification may comprise information about the attack such as the obtained measurement(s) indicative of the attack, the model 212 and/or the state of the computing device 202 (e.g., before, during or after the attack).

In some examples, the response module 214 may cause a restriction to the functionality of the computing device 202.

In some examples, the response module 214 may cause the computing device 202 to be locked, powered off or otherwise disabled (or restricted in function) until a management command is received by the response module 214 to permit increased (or normal) functionality of the computing device 202.

In some examples, the response module 214 may cause the computing device 202 to be locked, powered off or otherwise disabled (or restricted in function) until the determining module 210 determines that the measurement(s) provided by the measurement module 208 are indicative of an expected value for the measurement(s). For example, the determining module 210 may determine that an obtained measurement is indicative of compliance with the model 212 (e.g., the difference between the measurement and an expected value may be below a threshold).

In some examples, the response module 214 may implement any combination of the above examples to reduce or restrict the functionality of the computing device 202 in accordance with a particular protocol to reduce or manage the risk associated with a (potentially) compromised computing device 202.

Although depicted as separate modules in FIG. 2, any of: the measurement module 208, determining module 210, model 212 and response module 214 may be combined with any other of: the measurement module 208, determining module 210, model 212 and response module 214. Thus, processing circuitry for implementing the method 100 may comprise processing circuitry associated with any combination of: the measurement module 208, determining module 210, model 212 and response module 214.

In some examples, any of the modules described above (e.g., the measurement module 208, determining module 210, model 212 and response module 214) comprises at least one dedicated processor (e.g., an application specific integrated circuit (ASIC) and/or field programmable gate array (FPGA), etc) for implementing the functionality of the module.

In some examples, the module comprises at least one processor for implementing instructions which cause the at least one processor to implement the functionality of the module described above. In such examples, the instructions may be stored in a machine-readable medium (not shown) accessible to the at least one processor. In some examples, the module itself comprises the machine-readable medium. In some examples, the machine-readable medium may be separate to the module itself (e.g., the at least one processor of the module may be provided in communication with the machine readable medium to access the instructions stored therein).

Figure 3:
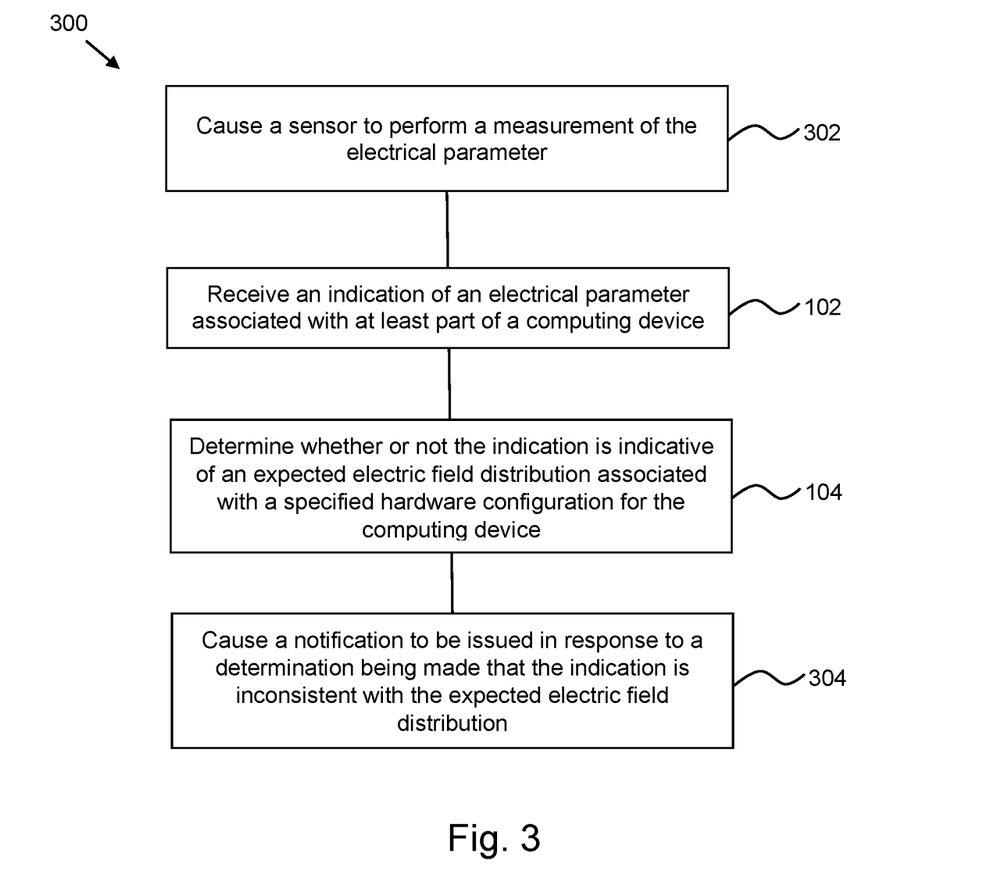
FIG. 3 is a flowchart of an example method of determining certain information about a computing device.

FIG. 3 depicts a flowchart of a method 300, which may be a computer-implemented method, of determining certain information about a computing device. The method 300 may be implemented by an entity such as an end user, manufacturer or other verifying entity. The method 300 may be implemented using processing circuitry of, for example, a personal computer, dedicated processing apparatus, server, cloud-based service or any other computing device. The method 300 may be implemented in conjunction with or as part of the method 100. Further reference is made to features of FIG. 2. In this example, the method 300 further comprises the blocks 102, 104 of the method 100.

In some examples, determining whether or not the indication is indicative of the expected electric field distribution associated with the specified hardware configuration for the computing device (i.e., block 104 of method 300) comprises comparing the indication of the electrical parameter with a previously-obtained indication of the electrical parameter. The method 300 may further comprise determining whether or not any deviation between the indication and the previously-obtained indication is indicative of an unexpected modification of the hardware configuration for the computing device. The previously-obtained indication may be accessible (e.g., via the model 212 of FIG. 2) to the determining module 210. Thus, the determining module 210 may receive the indication (e.g., when testing whether or not the computing device 202 has an expected provenance) and compare this received indication with the previously-obtained indication (e.g., which may have been obtained at a trusted point in the manufacturing process and stored in memory or used to generate the model 212).

In some examples, determining whether or not the indication is indicative of the expected electric field distribution associated with the specified hardware configuration for the computing device (i.e., block 104 of method 300) comprises determining whether or not the indication meets a specified criterion with respect to the expected electric field distribution. Where the specified criterion is met, a provenance of the computing device may meet an expectation. Where the specified criterion is not met, the provenance of the computing device may not meet the expectation.

In some examples, the specified criterion may comprise a threshold which, if exceeded, may be indicative of a potential tampering attempt (e.g., due to a change in the electric field distribution). For example, the provenance of the computing device 202 may meet an expectation (i.e., the computing device has not been tampered with) when the specified criterion is that the difference between the indication and the previously-obtained indication is below a threshold and/or if the analysis of the indication provides information that a change to the electric field distribution is not indicative of a tamper attempt (e.g., based on data provided by the model 212). The provenance may not meet the expectation when the specified criterion is that the difference between the indication and the previously-obtained indication meets or exceeds the threshold and/or if the analysis of the indication provides information that a change to the electric field distribution is indicative of a tamper attempt (e.g., based on data provided by the model 212).

In some examples, the method 300 comprises, at block 302, causing a sensor (e.g., sensor 204) to perform a measurement of the electrical parameter. For example, the measurement module 208 may be caused to obtain the measurement under various circumstances as described below.

In some examples, the sensor may be caused to perform the measurement at least one of: repeatedly; upon request by a verifying entity; and in response to a specified condition being met. In some examples, the specified condition may refer to a computing device state being changed e.g., due to a power off event or reboot. In some examples, the specified condition may refer to a determination being made that the computing device has been moved to a different location and/or a different entity now possesses the computing device.

In some examples, causing the sensor to perform the measurement with a specified sensitivity may be based on at least one of a purpose of the sensor, a state of the computing device and a location of the sensor relative to the computing device. In some examples, the sensitivity of the measurement may depend on any of the certain factors described above.

In some examples, receiving the indication (e.g., block 102 of the method 300) comprises receiving an indication of an electrical parameter measured at a plurality of locations associated with at least the part of the computing device. For example, the electrical parameter may be measured at multiple locations relative to the computing device. Where, in some examples, the sensor comprises a capacitor array, each capacitor may be associated with a different location and may provide the measurement at its particular location. In some examples, the measurement of the electrical parameter at each location may be performed by moving the sensor to different locations in order to take a measurement at the location (e.g., if the sensor comprises a single capacitor or other electrical component capable of detecting a variation in the electric field).

In some examples, determining whether or not the indication is indicative of the expected electric field distribution associated with the specified hardware configuration for the computing device may comprise using a model (e.g., an 'electric field distribution model') to determine whether or not the indication of the electrical parameter measured at the plurality of locations is indicative of the expected electric field distribution.

In some examples, the model is based on a previously-obtained indication of the electrical parameter measured at the plurality of locations (e.g., 'experimental data'). For example, the model may be constructed using data from previous measurements of the electrical parameter at the plurality of locations. In some examples, the model is based on a previously-obtained indication of the electrical parameter measured at the specified location.

In some examples, the model is based on information (e.g., 'theoretical knowledge') regarding how a hardware component of the computing device influences the expected electric field distribution. For example, the information may relate to how a hardware component may perturb or otherwise influence an electric field surrounding the hardware component. In another example, the information may relate to the expected electric field generated by the hardware component during operation (e.g., when powered up).

In some examples, any way in which the hardware component affects the expected electric field distributed may be modeled (e.g., using a previously-obtained indication and/or the information). Thus, the model may be based on at least one of: experimental data and theoretical knowledge regarding how a hardware component contributes to or otherwise affects an electric field.

In some examples, the method 300 comprises, at block 304, causing a notification to be issued in response to a determination being made that the indication is inconsistent with the expected electric field distribution. For example, the indication may be inconsistent with the expected electric field distribution if the specified criterion is not met and/or if the difference between the indication and a previously-obtained indication meets or exceeds a threshold.

In some examples, causing the notification to be issued may cause a certain action to be taken. For example, any one or combination of the following example actions may be taken. An example action may be that the notification is to be sent to a verifying entity. Another example action may be to restrict functionality of the computing device until the verifying entity permits an increase in functionality of the computing device. Another example action may be to restrict functionality of the computing device until a determination is made that the indication is indicative of the computing device functioning as expected.

Figure 4:
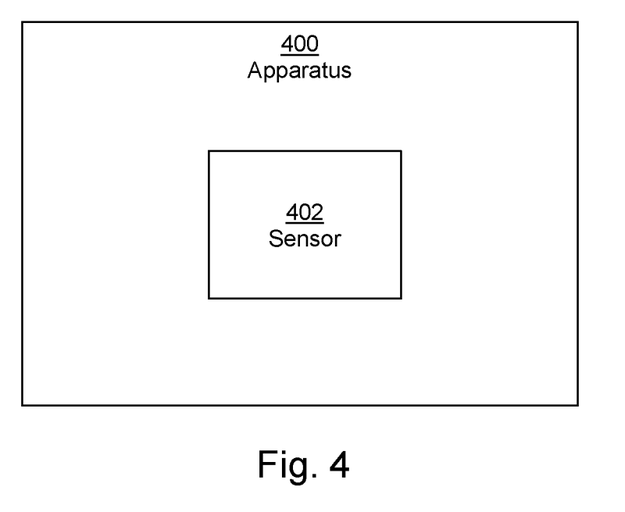
FIG. 4 is a simplified schematic illustration of an example apparatus for implementing certain methods.

FIG. 4 is a schematic illustration of an example apparatus 400 for implementing or at least partially facilitating certain methods described herein (e.g., method 100, 300). In some examples, the apparatus 400 comprises a computing device and/or be regarded as an example of a computing device such as computing device 202. In some examples, the apparatus 400 may be used to determine certain information regarding a computing device that is distinct/separate from the apparatus 400 itself.

The apparatus 400 comprises a sensor 402 to measure a characteristic of an electric field distribution (e.g., an electrical parameter associated with the electric field distribution) influenced by a hardware component of a computing device (e.g., of the apparatus 400 itself or of a distinct/separate computing device). In some examples, the sensor 402 may comprise a sensor (e.g., sensor 204 of FIG. 2) that is embedded, combined or otherwise integrated with the processing circuitry (e.g., the circuitry of the computing device) and/or packaging of the apparatus 400. In some examples, the sensor 402 may comprise a component that is capable of measuring the electrical parameter or otherwise sending the indication of the electrical parameter to another module (e.g., the measurement module 208 or the determining module 210 of FIG. 2).

In some examples, the sensor 402 may be sensitive to a change in the electric field distribution (e.g., due to a hardware component of the computing device). For example, the size, position and/or type of the hardware component may affect the electric field distribution. A change to the hardware component (e.g., due to tampering of the hardware component) may influence the electric field distribution, which may be detectable by the sensor 402.

In use of the apparatus 400, the sensor 402 sends an indication of the characteristic to a verifying entity. Sending the indication to the verifying entity may allow the verifying entity to determine, compared with a previously-determined electric field distribution associated with the computing device, whether or not a change in the electric field distribution has occurred. Thus, if a change has occurred, the verifying entity may determine whether or not the computing device has been tampered with. In some examples, the sensor 402 may send the indication to or via the measurement module 208 and/or the determining module 210 such as in FIG. 2. In some examples, the apparatus 400 may comprise the measurement module 208 such as referred to in FIG. 2, and this measurement module 208 may receive the indication of the characteristic from the sensor 402 and send the indication of the characteristic (e.g., an indication of the measurement of the electrical parameter) to (e.g., the determining module 210 of) the verifying entity.

Figure 5:
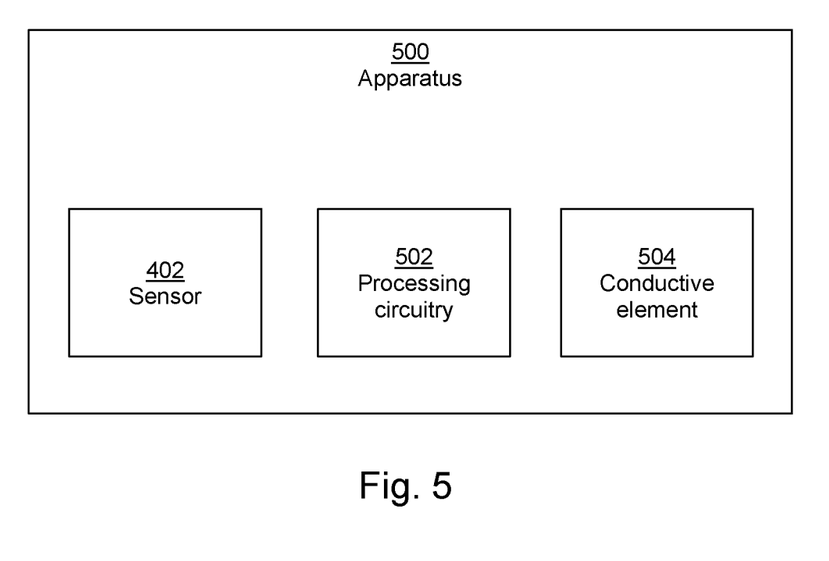
FIG. 5 is a simplified schematic illustration of an example apparatus for implementing certain methods.

FIG. 5 is a schematic illustration of an example apparatus 500 for implementing or at least partially facilitating certain methods described herein (e.g., method 100, 300). The apparatus 500 comprises processing circuitry 502, which may comprise a computing device such as computing device 202. The apparatus 500 may comprise or communicate with certain modules or apparatus such as described in relation to FIG. 2.

In this example, the apparatus 500 comprises the sensor 402 of FIG. 4. The sensor 402 is not part of the processing circuitry 502 in this example but in other examples may form part of the processing circuitry 502.

In some examples, the sensor 402 comprises a capacitor array (such as described in relation to FIG. 2) for measuring the characteristic of the electric field distribution at different locations of the apparatus 500.

In some examples, the capacitor array comprises a plurality of capacitors distributed across the apparatus 500. The indication of the characteristic may be indicative of a capacitance value associated with the capacitor at each of the different locations. For example, each capacitor may have a certain associated capacitance value which is dependent on the electric field distribution associated with the computing device (and/or due to the electric field generated by the capacitor itself). The indication of the characteristic (i.e., the capacitance value for each of the plurality of capacitors) may be used to determine (e.g., with reference to a model) whether or not the computing device has been changed (e.g., tampered with).

In some examples, certain capacitors of the capacitor array may be distributed uniformly across the apparatus 500 (for example, at least part of the apparatus 500 may comprise a plurality of uniformly distributed capacitors distributed according to a regular pattern such as described above). In some examples, certain capacitors of the capacitor array may be distributed non-uniformly across the apparatus 500 (for example, at least part of the apparatus 500 may comprise a plurality of non-uniformly distributed capacitors distributed according to an irregular pattern such as described above).

In some examples the apparatus 500 further comprises a conductive element 504. The conductive element 504 may modify the electric field distribution to create a signature electric field distribution linked to processing circuitry 502 (e.g., a computing device) of the apparatus 500. For example, the conductive element 504 may be formed in such a way to modify the electric field distribution in a manner that is related to the identity of the apparatus 500. Thus, each apparatus 500 comprising a computing device may be manufactured to have its own signature electric field distribution so that each apparatus 500 is distinguishable from the other apparatus 500 even though each apparatus 500 comprises the same components.

In some examples, the conductive element 504 may be included with the apparatus 500 in such a way to facilitate measurements of the electric field. For example, the conductive element 504 may enhance or otherwise modify the electric field distribution in a readily detectable manner. In some examples, an entity such as unauthorized manufacturer may struggle to replicate the same electric field distribution with a compromised or unauthorized component/apparatus 500.

In some examples, the signature electric field distribution may be determined at a trusted point in the manufacturing of the apparatus 500 or at another appropriate time. This signature electric field distribution may serve as a trusted reference point which may, for example, be communicated to a repository (e.g., the model 212) which can be accessed for future measurements to determine whether or not the apparatus 500 has been tampered with or cannot be trusted for some reason.

In some examples, the conductive element 504 comprises a plurality of conductive particles. The plurality of conductive particles may be introduced into the PCA and/or the packaging (e.g., shell) of the apparatus 500 (e.g., by a trusted entity during manufacture of the apparatus 500).

In some examples, the conductive element 504 may be included in the apparatus 500 in a non-deterministic process to create a physically unclonable function for the signature electric field distribution. The signature electric field distribution may be difficult to replicate if the conductive element 504 is included using the non-deterministic process. Where the conductive element comprises a plurality of conductive particles, these particles may be included in the apparatus 500 in a non-deterministic fashion (e.g., they may be randomly incorporated into or otherwise combined with the apparatus 500).

Figure 6:
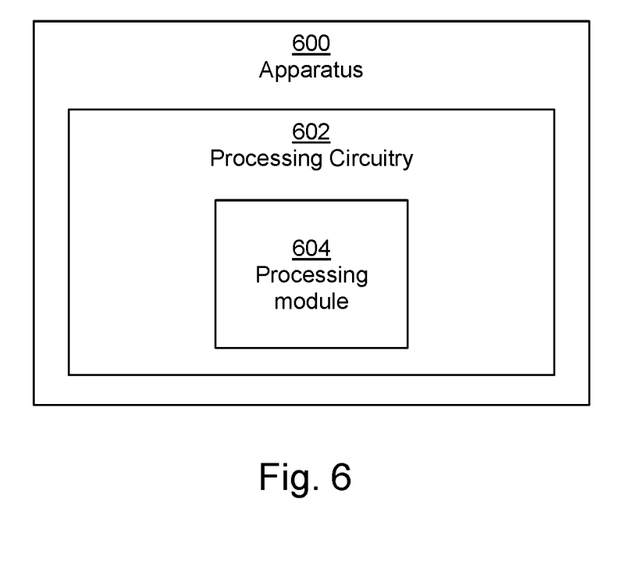
FIG. 6 is a simplified schematic illustration of an example apparatus for implementing certain methods.

FIG. 6 is a schematic illustration of an example apparatus 600 for implementing or at least partially facilitating certain methods described herein (e.g., method 100, 300). The apparatus 600 comprises processing circuitry 602. The processing circuitry 602 may comprise certain modules or apparatus (e.g., the measurement module 208) such as described in relation to FIG. 2. In this example, the apparatus 600 is a separate/distinct apparatus to the apparatus 400 of FIG. 4. The apparatus 600 may be used to control operation of and/or receive measurements from the apparatus 400. In some examples, the apparatus 600 may be combined with or otherwise integrated with the apparatus 400.

The processing circuitry 602 comprises a processing module 604 for determining whether or not a measurement is to be obtained from a sensor (e.g., the sensor 204 of FIG. 2) for measuring the electric field associated with a specified hardware configuration for the computing device (e.g., computing device 202). Upon a determination being made that a measurement is to be obtained, the processing module 604 may cause the sensor 204 to obtain the measurement. This measurement (or an indication thereof) provided/sent by the sensor 204 may be received by the apparatus 600 itself or another apparatus (e.g., comprising the determining module 210 of FIG. 2) in order to allow a determination to be made regarding whether or not the electric field distribution associated with a specified hardware configuration for the computing device is as expected.

In some examples, the processing module 604 comprises at least one dedicated processor (e.g., an application specific integrated circuit (ASIC) and/or field programmable gate array (FPGA), etc) for implementing the functionality of the processing module 604 described above.

In some examples, the processing module 604 comprises at least one processor for implementing instructions which cause the at least one processor to implement the functionality of the processing module 604 described above. In such examples, the instructions may be stored in a machine-readable medium (not shown) accessible to the at least one processor. In some examples, the apparatus 600 comprises the machine-readable medium. In some examples, the machine-readable medium may be separate to the apparatus 600 (e.g., the at least one processor of the processing module 604 may be provided in communication with the machine readable medium to access the instructions stored therein).

In some examples, the processing module 602 comprises the measurement module 208 of FIG. 2.

In some examples, the processing circuitry 602 further comprises another module such as any one or combination of: the determining module 210, the model 212 and the response module 214 of FIG. 2.

Figure 7:
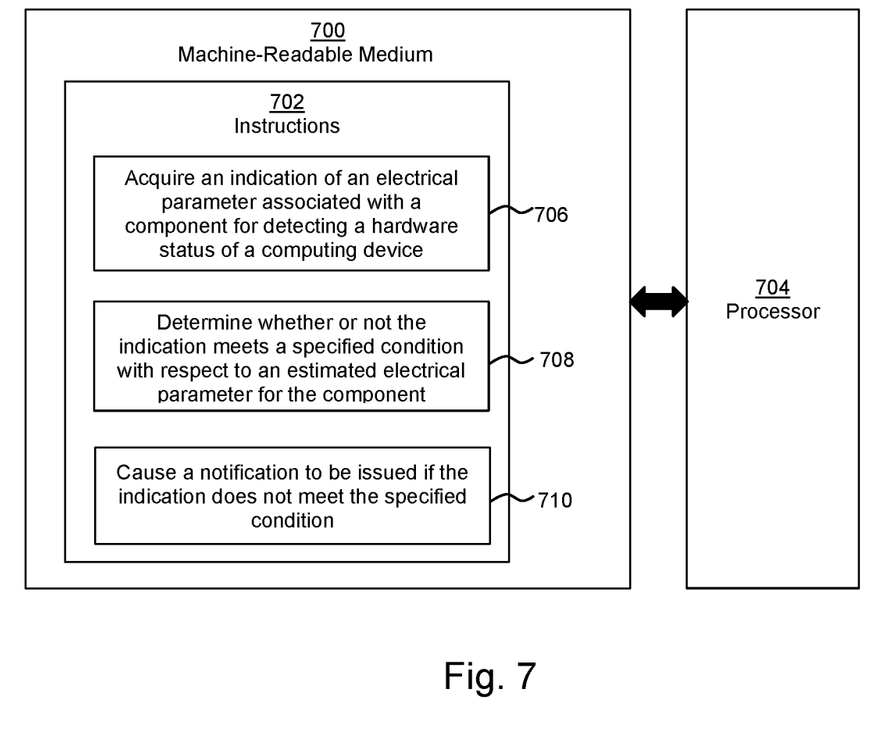
FIG. 7 is a simplified schematic illustration of an example machine-readable medium associated with a processor.

FIG. 7 schematically illustrates a machine-readable medium 700 (e.g., a tangible machine-readable medium) which stores instructions 702, which when executed by at least one processor 704, cause the at least one processor 704 to carry out certain example methods described herein (e.g., the method 100 or 300).

The instructions 702 comprise instructions 706 to cause the at least one processor 704 to acquire an indication of an electrical parameter associated with a component (e.g., a 'hardware component') for detecting a hardware status of a computing device. In some examples, the instructions 706 may cause the at least one processor 704 to provide the same or similar functionality of block 102 of the method 100.

In some examples, the hardware status may refer to a hardware configuration of the computing device. In some examples, the hardware status may refer to a number, size, position and/or type of the component used in the computing device. In some examples, the indication may be indicative of an expected electric field distribution associated with a specified hardware configuration for the computing device.

The instructions 702 further comprise instructions 708 to cause the at least one processor 704 to determine whether or not the indication meets a specified condition with respect to an estimated electrical parameter for the component. The estimated electrical parameter may be based on an electric field distribution model (e.g., the model 212) for the computing device and the specified condition may be indicative of the hardware status of the computing device being as expected. The hardware status may be as expected if the component (or indeed any other part of the computing device) has not been tampered with or is otherwise considered to be not compromised or unauthorized. In some examples, the instructions 708 may cause the at least one processor 704 to provide the same or similar functionality to block 104 of the method 100.

The instructions 702 further comprise instructions 710 to cause the at least one processor 704 to cause a notification to be issued if the indication does not meet the specified condition. In some examples, the instructions 710 may cause the at least one processor 704 to provide the same or similar functionality to the response module 214 of FIG. 2.

Certain modules of apparatus described herein may be combined with certain modules of other apparatus described herein. For example, any of the modules or apparatus described in relation to any one of FIGS. 2, 4, 5 and 6 may be combined with or replace any of the modules or apparatus described in relation to any other of FIGS. 2, 4, 5 and 6. Further, certain modules or apparatus described herein may at least partially provide the same or similar functionality as certain methods described herein (e.g., methods 100, 300), and vice versa.

Examples in the present disclosure can be provided as methods, systems or as a combination of machine readable instructions and processing circuitry. Such machine readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to examples of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing circuitry, or a module thereof, may execute the machine readable instructions. Thus functional modules or apparatus of the system 200, apparatus 400, 500, 600 (for example, the measurement module 208, determining module 210, model 212, response module 214, communication module 406 and/or processing module 604) and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the scope of the present disclosure. It is intended, therefore, that the method, apparatus and related aspects be limited by the scope of the following claims and their equivalents. It should be noted that the above-mentioned examples illustrate rather than limit what is described herein, and that many implementations may be designed without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving an indication of an electrical parameter associated with computing device; and
   determining, using processing circuitry and a conductive element for modifying an electric field distribution to create a signature electric field distribution linked to the processing circuitry, whether or not the indication is indicative of the signature electric field distribution associated with computing device.

2. The method of claim 1, where receiving the indication comprises receiving an indication of an electrical parameter measured at a plurality of locations associated with the computing device.

3. The method of claim 2, where determining whether or not the indication is indicative of the signature electric field distribution associated with the the computing device comprises using a model to determine whether or not the indication of the electrical parameter measured at the plurality of locations is indicative of the signature electric field distribution, where the model is based on at least one of:
   a previously-obtained indication of the electrical parameter measured at the plurality of locations; and
   information regarding how a hardware component of the computing device influences the signature electric field distribution.

4. The method of claim 1, where determining whether or not the indication is indicative of the signature electric field distribution associated with the computing device comprises:
   comparing the indication of the electrical parameter with a previously-obtained indication of the electrical parameter; and
   determining whether or not any deviation between the indication and the previously-obtained indication is indicative of an unexpected modification of the computing device.

5. The method of claim 1, where determining whether or not the indication is indicative of the signature electric field distribution associated with a specified hardware configuration for the computing device comprises determining whether or not the indication meets a specified criterion with respect to the signature electric field distribution such that: where the specified criterion is met, a provenance of the computing device meets an expectation and where the specified criterion is not met, the provenance of the computing device does not meet the expectation.

6. The method of claim 1, comprising causing a sensor to perform a measurement of the electrical parameter.

7. The method of claim 6, comprising causing the sensor to perform the measurement with a specified sensitivity based on at least one of: a purpose of the sensor; a state of the computing device and a location of the sensor relative to the computing device.

8. The method of claim 1, comprising causing a notification to be issued in response to a determination being made that the indication is inconsistent with the signature electric field distribution.

9. The method of claim 8, where causing the notification to be issued causes at least one of: the notification to be sent to a verifying entity; restriction of functionality of the computing device until the verifying entity permits an increase in functionality of the computing device; restriction of functionality of the computing device until a determination is made that the indication is indicative of the computing device functioning as expected.

10. Apparatus comprising:
    a sensor to measure a characteristic of an electric field distribution influenced by a hardware component of the apparatus, where the sensor is to send an indication of the characteristic to a verifying entity, to allow the verifying entity to determine, compared with a previously-determined electric field distribution associated with the apparatus, whether or not a change in the electric field distribution has occurred; and
    a conductive element for modifying the electric field distribution to create a signature electric field distribution linked to processing circuitry of the apparatus.

11. The apparatus of claim 10, where the sensor comprises a capacitor array for measuring the characteristic of the electric field distribution at different locations of the apparatus.

12. The apparatus of claim 11, where the capacitor array comprises a plurality of capacitors distributed across the apparatus, and where the indication of the characteristic is indicative of a capacitance value associated with the capacitor at each of the different locations.

13. The apparatus of claim 10, where the conductive element is included in the apparatus in a non-deterministic process to create a physically unclonable function for the signature electric field distribution.

14. A tangible machine-readable medium storing instructions which, when executed by at least one processor, cause the at least one processor to:
    acquire an indication of an electrical parameter associated with a component for detecting a hardware status of a computing device;
    determine, using processing circuitry and a conductive element for modifying an electric field distribution to create a signature electric field distribution linked to the processing circuitry, whether or not the indication meets a specified condition with respect to an estimated electrical parameter for the component based on an electric field distribution model for the computing device, where the specified condition is indicative of the hardware status of the computing device being as expected; and
    cause a notification to be issued if the indication does not meet the specified condition.

* * * * *